United States Patent
Lee et al.

(10) Patent No.: US 9,096,474 B2
(45) Date of Patent: Aug. 4, 2015

(54) MOLD FOR SYNTHESIZING CERAMIC POWDER BY MEANS OF A SPARK PLASMA SINTERING METHOD

(75) Inventors: Sea Hoon Lee, Seoul (KR); Hai Doo Kim, Changwon-si (KR); Jae Woong Ko, Changwon-si (KR)

(73) Assignee: KOREA INSTITUTE OF MACHINERY & MATERIALS, Daejeon (KR)

(*) Notice: Subject to any disclaimer, the term of this patent is extended or adjusted under 35 U.S.C. 154(b) by 507 days.

(21) Appl. No.: 13/395,890

(22) PCT Filed: Apr. 1, 2010

(86) PCT No.: PCT/KR2010/002012
§ 371 (c)(1),
(2), (4) Date: Mar. 14, 2012

(87) PCT Pub. No.: WO2011/034269
PCT Pub. Date: Mar. 24, 2011

(65) Prior Publication Data
US 2012/0183637 A1   Jul. 19, 2012

(30) Foreign Application Priority Data
Sep. 15, 2009  (KR) .................. 10-2009-0087220

(51) Int. Cl.
 *B29C 35/08*  (2006.01)
 *C04B 35/64*  (2006.01)
 *C04B 35/56*  (2006.01)

(52) U.S. Cl.
CPC .......... *C04B 35/64* (2013.01); *C04B 35/56* (2013.01); *B22F 2999/00* (2013.01); *C04B 2235/666* (2013.01)

(58) Field of Classification Search
CPC .. C04B 35/64; C04B 35/56; C04B 2235/666; B22F 2999/00
USPC .......................................... 425/174
See application file for complete search history.

(56) References Cited

U.S. PATENT DOCUMENTS 3,615,382 A * 10/1971 Manilla et al. .................. 419/38

FOREIGN PATENT DOCUMENTS

| JP | 07-216409 A | 8/1995 |
| JP | 2000-128648 A | 5/2000 |
| JP | 2000-335962 A | 12/2000 |
| JP | 2003-277133 A | 10/2003 |

OTHER PUBLICATIONS

International Search Report in International Application No. PCT/KR2010/002012, dated Dec. 6, 2010.

* cited by examiner

*Primary Examiner* — Dimple Bodawala
*Assistant Examiner* — Robert J Grun
(74) *Attorney, Agent, or Firm* — Park, Kim & Suh, LLC

(57) ABSTRACT

This invention relates to a mold for synthesizing powder, and particularly to a mold for synthesizing ceramic powder suitable for use as a mold system which is subjected to spark plasma sintering, which includes a cylindrical mold body into which a powder material used to synthesize ceramic powder is charged, and a pair of mold covers respectively disposed in contact with the top and the bottom of the mold body, thus basically suppressing the production of aggregates in synthesized powder due to pressing and also enabling the mold system to operate even when using a small amount of power, so that the system is prevented from malfunctioning and the power consumption thereof is reduced upon operating.

7 Claims, 6 Drawing Sheets

Fig. 4
400
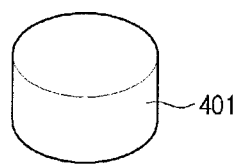
401
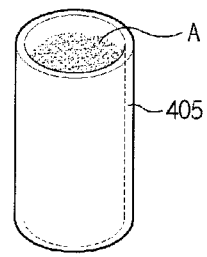
A
405
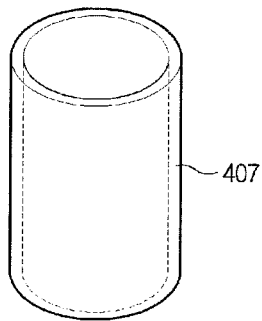
407
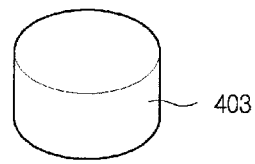
403

Fig. 6
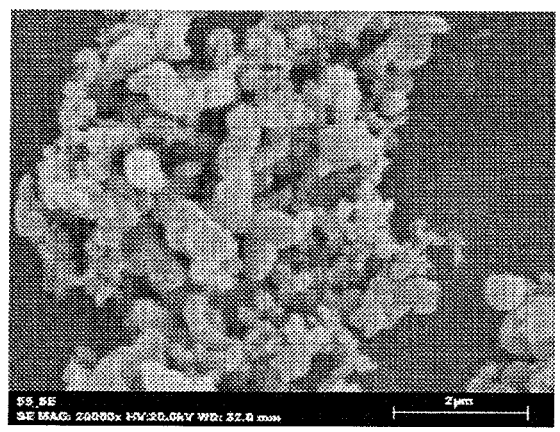
(a)
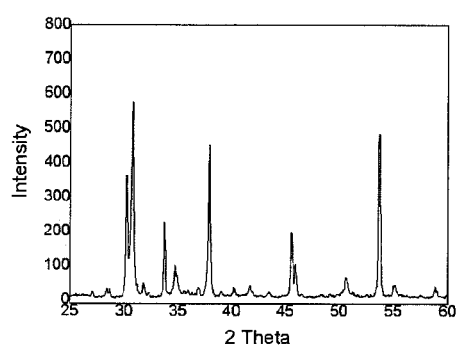
(b)
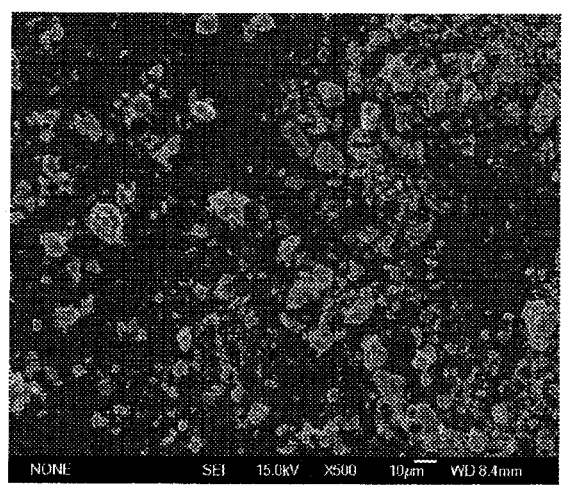
(c)

MOLD FOR SYNTHESIZING CERAMIC POWDER BY MEANS OF A SPARK PLASMA SINTERING METHOD

BACKGROUND OF THE INVENTION

1. Field of the Invention

The present invention relates to a mold for synthesizing powder, and, more particularly, to a mold for synthesizing ceramic powder suitable for use as a mold system which is subjected to spark plasma sintering, which comprises a cylindrical mold body into which a powder material used to synthesize ceramic powder is charged, and a pair of mold covers respectively disposed in contact with the top and the bottom of the mold body, thus basically suppressing the production of aggregates in synthesized powder due to pressing and also enabling the mold system to operate even with a small amount of power, so that the system is prevented from malfunctioning and the power consumption thereof when operating may be reduced.

2. Description of the Related Art

In order to synthesize ceramic powder, spark plasma sintering methods are known to be useful under conditions of temperature lower than conventional synthesis temperatures and maintenance time shorter than the conventional maintenance time, and thus thorough research into them is ongoing.

The configuration of a conventional system used in the spark plasma sintering process is one that combines a mold and electrodes. As shown in FIG. 1, the mold 100 includes a mold body 101 into which a power material A used to synthesize powder is charged, and electrodes 102, 103 formed at the top and the bottom of the mold body 101. These electrodes are disposed in contact with a press unit 107 that applies pressure to the powder material A, so that the powder material A is pressed by the press unit 107 and is also heated by power supplied to the electrodes 102, 103 and thus synthesized into the desired powder.

In the drawing, the downward arrow indicates the direction of electricity flow.

So that electricity efficiently flows between the press unit 107 and the powder material A, a high pressure of ones to tens of MPa should be applied to the powder material A. When pressure is applied at high temperature in this way, the synthesized powder may form a neck due to sintering effects generated in the synthesis process and thus may undesirably form a large amount of aggregates. For reference, the case where sintering is carried out using powder having many aggregates is very problematic because the sintering density may be remarkably decreased due to pores formed in the aggregates.

Also because a mold is typically manufactured to be thick so as to withstand pressure, the body thereof is heated by allowing a large amount of current to flow through the press unit 107 having a smaller cross-sectional area than that of the mold body. As such, however, such current is intensively applied to the press unit 107, and thereby high resistance occurs, undesirably easily heating the press unit 107. Thus, there may be many cases wherein the temperature of the press unit becomes excessively higher than the temperature of the mold body, the powder material or the synthesized powder. Accordingly, in the case of powder synthesized near the press unit, undesired reactions that have an adverse influence on the properties of powder, such as the excessive growth of particles and pyrolysis at high temperature, may take place.

As the electrodes which are in direct contact with the press unit at high temperature and the mold having a high thickness are also rapidly heated, like the press unit, the spark plasma sintering furnace may malfunction, making it difficult to perform a synthesis process at high temperature for a long period of time.

SUMMARY OF THE INVENTION

Accordingly, the present invention has been made keeping in mind the above problems encountered in the related art, and an object of the present invention is to provide a mold for synthesizing ceramic powder using spark plasma sintering, wherein a powder material used to synthesize predetermined ceramic powder is synthesized via spark plasma sintering without performing pressing by eliminating a press unit that was provided in a conventional mold, thus maximally suppressing the production of aggregates in synthesized powder.

Another object of the present invention is to provide a mold for synthesizing ceramic powder using spark plasma sintering, wherein a mold body which need not be able to resist a large amount of pressure thanks to the absence of a press unit is made thin and mold covers having a cross-sectional area greater than that of the mold body are introduced to supply electricity thereto thus preventing resistance generated from the mold covers from rapidly increasing, unlike a conventional mold wherein the body of such a mold that is typically manufactured to be thick so that it withstands pressure is heated by allowing a large amount of current to flow through the press unit having a smaller cross-sectional area than that of the mold body.

A further object of the present invention is to provide a mold for synthesizing ceramic powder using spark plasma sintering, wherein the cross-sectional area of a mold body is reduced compared to a conventional mold, and thus the mold body is easily heated even with a small amount of electricity, thereby preventing the electrodes from overheating and reducing power consumption.

Still a further object of the present invention is to provide a mold for synthesizing ceramic powder using spark plasma sintering, wherein mold covers having a cross-sectional area greater than that of a mold body are introduced to solve the problems of a conventional mold, namely, to prevent the powder material, carbon electrodes, and a metallic pressing shaft of the body of equipment in direct contact with the electrodes from being sequentially heated due to rapid heating based on the intensive application of current to a press unit, whereby the equipment is prevented from malfunctioning even when the synthesis process is carried out at high temperature for a long period of time.

In order to accomplish the above objects, the present invention provides a mold for synthesizing ceramic powder using spark plasma sintering, the mold being suitable for use as a mold system which is subjected to spark plasma sintering, the mold also comprising a cylindrical mold body into which a powder material used to synthesize ceramic powder is charged, and a pair of mold covers respectively disposed in contact with the top and the bottom of the cylindrical mold body.

Each of the mold covers may have a recess into which at least a portion of the mold body is inserted, and the inner diameter of the recess may be greater than the outer diameter of the mold body.

Also, at least a portion of an outer surface of the mold body and at least a portion of an inner surface of the recess of each of the mold covers may be threaded to form threaded connections between the mold body and the mold covers, so that the mold body and the mold covers are removably attached to each other.

The mold may further comprise a cylindrical assistant mold body in which the cylindrical mold body is housed and which is configured to allow the pair of mold covers to be passed therethrough, so that the mold covers are stably supported by the assistant mold body.

The mold body and the assistant mold body may be formed separately from each other, or may be integrally formed with each other.

The shape of the transverse cross-section of the outer or inner portion of the cylindrical assistant mold body may be any one selected from among a circular shape, an oval shape, and a polygonal shape.

Furthermore, at least a portion of an outer surface of the mold covers and at least a portion of an inner surface of the assistant mold body may be threaded to form threaded connections between the mold covers and the assistant mold body, so that the mold covers and the assistant mold body are removably attached to each other.

The shape of the transverse cross-section of the outer or inner portion of the cylindrical mold body may be any one selected from among a circular shape, an oval shape, and a polygonal shape.

At least one of the mold body and the assistant mold body may have at least one hole into which a thermocouple or a pyrometer can be inserted.

BRIEF DESCRIPTION OF THE DRAWINGS

The above and other objects, features and advantages of the present invention will be more clearly understood from the following detailed description taken in conjunction with the accompanying drawings, in which:

FIG. 4 is an exploded perspective view showing a mold body, mold covers and an assistant mold body in a mold system according to another embodiment of the present invention;

FIG. 6A is an image showing the microstructure of $Al_3BC_3$ synthesized from the powder material via a spark plasma sintering process at 1525° C. for 15 min using the mold of FIG. 2, FIG. 6B is X-ray results of such $Al_3BC_3$, and FIG. 6C is an image showing the microstructure of powder obtained by synthesizing the same material at 1800° C. for 2 hr using an induction furnace.

DESCRIPTION OF SPECIFIC EMBODIMENTS

Hereinafter, a detailed description will be given of the present invention with reference to the appended drawings.

The present invention is characterized in that powder is subjected to spark plasma sintering without directly applying pressure thereto, resistance occurring from a mold can be reduced to thus prevent rapid heating of the mold and electrodes, a high-temperature process is stabilized, the cross-sectional area of a mold body is reduced so that the sintering process can be performed even with a small amount of power, thereby achieving power savings, which will be embodied by the construction of the present invention.

Figure 1:
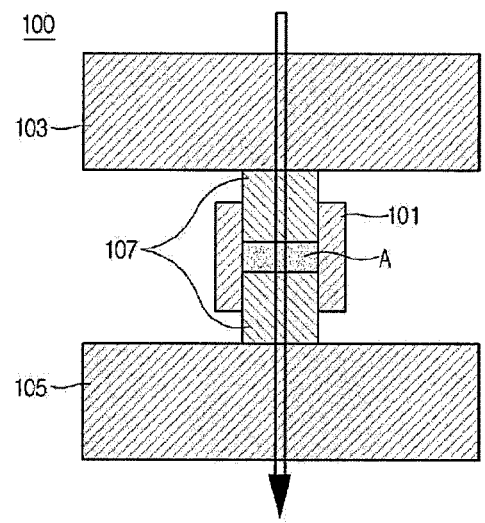
FIG. 1 is a longitudinal cross-sectional view showing a conventional mold.
Figure 2:
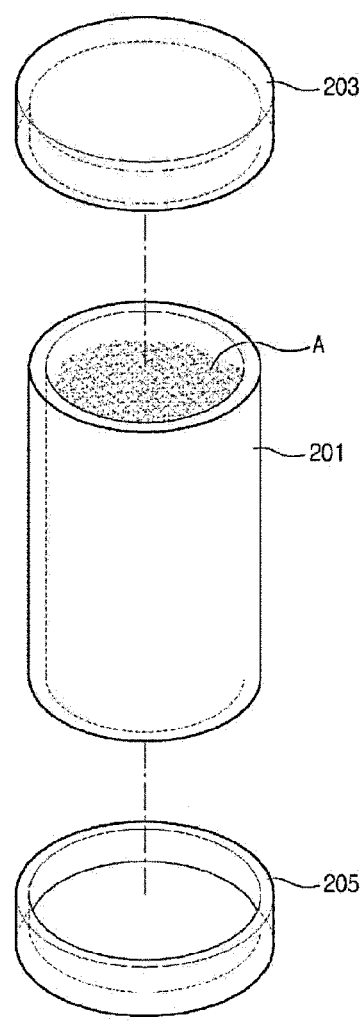
FIG. 2 is an exploded perspective view showing a mold body and mold covers in a mold according to an embodiment of the present invention.

FIG. 2 is an exploded perspective view showing a mold 200 for spark plasma sintering according to an embodiment of the present invention. As shown in FIG. 2, the mold 200 includes a cylindrical mold body 201 into which a powder material A used to synthesize predetermined ceramic powder may be charged, and a pair of mold covers 203, 205 removably attached to the top and the bottom of the mold body 201. Herein, the pair of mold covers 203, 205 are referred to as an upper mold cover 203 and a lower mold cover 205.

The cylindrical mold body 201 is provided so that the shape of the transverse cross-section of the inner or outer portion thereof is circular, oval or polygonal, and the shape thereof is not particularly limited.

Figure 3:
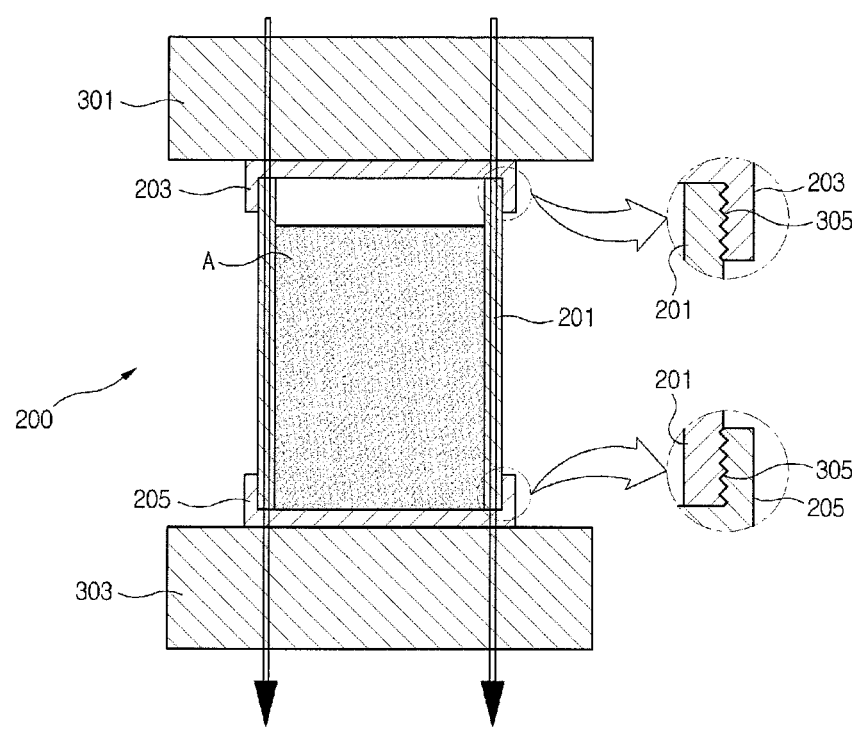
FIG. 3 is a longitudinal cross-sectional view showing the mold system including electrodes according to the embodiment of the present invention.

FIG. 3 is a longitudinal cross-sectional view showing the mold 200 for spark plasma sintering according to the embodiment of the present invention. As shown in FIG. 3, a pair of electrodes 301, 303 is disposed in contact with the top of the upper mold cover 203 and the bottom of the lower mold cover 205, respectively, and power is supplied by means of the electrodes 301, 303 to thereby heat the mold body 201. Accordingly, heat is transferred to the powder material A charged into the mold body 201, so that such a powder material is synthesized into predetermined ceramic powder.

In the drawing, the downward arrow indicates the direction of electricity flow.

Like the conventional mold, the mold 200 according to the present invention is configured such that the mold 200 and the electrodes 301, 303 are disposed in close contact so as to enable electricity to efficiently flow through the electrodes 301, 303. To this end, a pressure of ones to tens of MPa should be applied to the mold.

Because the mold body 201 which is in direct contact with the mold covers 203, 205 tolerates the net pressure thus applied, there is no pressure that is applied to the powder material A in the mold 200 according to the present invention without the additional use of a press unit.

In the case of the conventional mold 100, the mold body is subjected to high tensile stress in the transverse direction by pressing of the powder material in the transverse direction using the compression of the press unit 107. Because a mold material for use in spark plasma sintering is very weak to tensile stress relative to compressive stress, the thickness of the mold body should be increased so that such tensile stress can be endured.

The thickness of the conventional mold body 101 is 20~30 mm when the diameter of the inner hole is 20 mm. Thus, if the thickness of the body is 20 mm, the area ratio of the mold body 101 to the press unit 107 amounts to 8:1. As electricity flows via the press unit 107 having the area of 1 to heat the mold body having a large area of 8, the press unit 107 may be undesirably rapidly heated. Furthermore, a large amount of current should be used to heat the mold body having a large area, and thereby the electrodes may also be easily heated.

Whereas, in the case of the mold 200 according to the present invention, as shown in FIG. 3, compressive stress, not tensile stress, is applied, and thus the thickness of the mold body 201 may be maintained to about 3 mm even when the diameter of the inner hole of the mold 200 is 20 mm. In this case, the area ratio of the mold body 201 with respect to the mold covers 203, 205 is 0.3 or less, from which the area of the mold body appears to be much smaller than that of the mold covers 203, 205.

The mold body 201 should endure a compressive stress of about 20 MPa and thus needs a thickness of at least 2 mm. In this way, compared to the conventional mold 100, because the cross-sectional area of the mold body 201 is made much smaller, even when a smaller amount of electricity is supplied, the mold body 201 is easily heated. Also, because the cross-sectional area of the mold body 201 is considerably smaller than that of the mold covers 202, 203, the heating of the mold covers 203, 205 which are in direct contact with the electrodes is effectively suppressed. Thus, in the case where the mold 200 according to the present invention is used, a smaller amount of electricity is consumed and heat treatment at high temperature for a longer period of time is possible, compared to when using the conventional mold 100. From the point of view of power consumption upon synthesis at 1500° C., the mold 200 according to the present invention approximately requires only half the amount of power when using the conventional mold 100.

The mold 200 according to the present invention is configured such that the mold body 201 is completely closed, or at least one hole (not shown) is formed and a pyrometer or a thermocouple is inserted therein to measure the temperature of the powder in the mold 200.

In order to prevent the powder from being discharged from the contact portions between the mold body 201 and the mold covers 203, 205 and to enhance the bonding force therebetween, threads 305 may be formed on the mold body 201 and the mold covers 203, 205 to form threaded connections between the mold body and the mold covers, as necessary.

Each of the mold covers 203, 205 is configured such that one side is closed and the other side is opened, and the opened portion is referred to as a recess.

At least a portion of the outer surface of the mold body 201 and at least a portion of the inner surface of the recess of each of the mold covers 203, 205 are formed with the threads 305.

To compare the workability of the conventional mold 100 with that of the mold 200 of the present invention, the following test was conducted.

The conventional mold 100 and the mold 200 of the present invention were heated to 1500° C. at a rate of 50° C./min, after which changes in temperature of the powder charged into the mold body 201 were measured. In the case of using the conventional mold 100, overheating of about 30° C. was observed even after the temperature reached 1500° C., whereas when using the mold 200 of the present invention, there was overheating of about 4° C. Thereby, the mold 200 of the present invention exhibited improved temperature stability.

Also when the temperature was kept at 1500° C., temperature changes of the electrodes were observed. In the case of using the conventional mold 100, when 10 min or longer was maintained to synthesize 0.8 g of a powder material, the electrodes 103, 105 were heated to 700° C. or higher, and reddish heat was generated, making it difficult to increase the period of time required to synthesize the powder.

However, in the case of using the mold 200 of the present invention, when 30 min was maintained to synthesize 3.5 g of powder, the temperature of the electrodes 301, 303 was kept to 600° C. or lower and the electrodes 301, 303 giving off heat was not observed. Although the actual temperature of the electrodes 301, 303 is estimated to be much lower than 600° C. when the mold 200 of the present invention is used, it is below the measurable range of a pyrometer used to measure temperature and thus cannot be accurately measured.

Such a temperature difference of the electrodes imposes a certain constraint on operating the spark plasma sintering furnace. This is because the electrodes are in direct contact with a metallic pressing shaft (not shown, which is formed to press the top of electrodes) of the equipment. The metallic pressing shaft may be partially cooled by cooling water, but when the temperature of the metallic pressing shaft in the spark plasma sintering furnace increases excessively, the deformation of the pressing shaft and the damage to the equipment may be caused by the applied high pressure, making it impossible to perform calcination for a relatively long period of time to synthesize powder with uniform qualities.

Briefly, according to the conventional technique, the equipment may malfunction due to overheating of the electrodes resulting from overheating of the press unit 107, and the overheating of the press unit 107 may negatively affect the properties of powder to be synthesized. An object of the present invention is to solve such problems.

Figure 5:
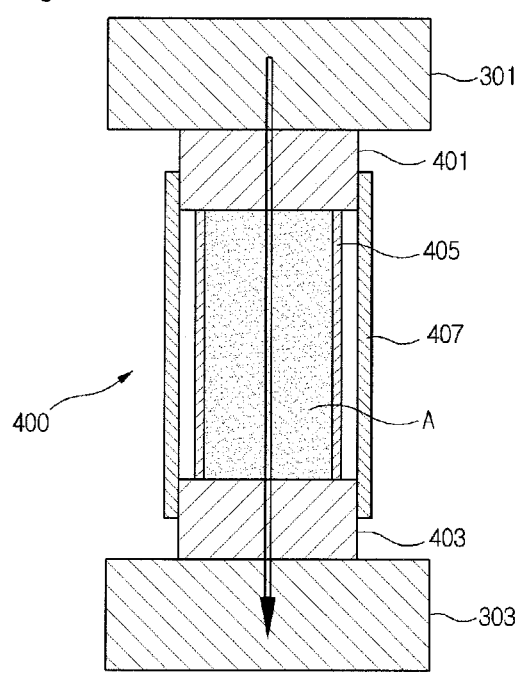
FIG. 5 is a longitudinal cross-sectional view showing the mold system including electrodes according to another embodiment of the present invention.

FIG. 4 is an exploded perspective view showing a mold body, mold covers and an assistant mold body in a mold system according to another embodiment of the present invention, and FIG. 5 is a longitudinal cross-sectional view showing the mold system including electrodes according to another embodiment of the present invention.

As shown in the drawings, the mold 400 according to another embodiment of the present invention includes a mold body 405 and mold covers 401, 403 in contact with the top and the bottom of the mold body, which are embodied in slightly different shapes, and further includes a cylindrical assistant mold body 207 in which the mold body 405 is housed and which is configured to allow the pair of mold covers 401, 403 to be passed therethrough, so that the mold covers are stably supported by the inner wall of the cylindrical body.

The assistant mold body 407 and the mold body 405 are formed separately from each other. Although not shown, they may be integrally formed with each other.

The assistant mold body 407 may be embodied so that the shape of the transverse cross-section of the outer or inner portion thereof is circular, oval, polygonal, etc., but is not limited thereto. The shape of the inner portion thereof is preferably similar to that of the transverse cross-section of the mold covers 401, 403 so as to allow the mold covers 401, 403 to be passed therethrough.

Also the inner diameter of the assistant mold body 407 is preferably set to be similar to the outer diameter of the mold covers 401, 403 so as to allow the mold covers 401, 403 to be passed through the assistant mold body 407 and seated therein.

At least a portion of the outer surface of the mold covers 401, 403 and at least a portion of the inner surface of the assistant mold body 407 are formed with threads (not shown), so that the mold covers and the assistant mold body may be removably attached to each other.

The relation between the assistant mold body 407 and the mold covers 401, 403 is similar to the relation between the mold body 101 and the press unit 107 in the conventional mold 100, but the functions thereof and the actions that they have on the powder are quite different.

The powder material A is charged into the mold body 405, and pressing by the pressing shaft of the equipment does not directly apply pressure to the powder but applies the pressure only to the mold covers 401, 403, as in the mold 200 of the present invention as mentioned above. Also in this case, the application of tensile stress to the mold body 405 is prevented, whereby the mold body 201 may be formed thin, thus reducing power consumption and effectively suppressing overheating of the electrodes and pyrolysis of the synthesized powder at high temperature.

Although the hole mentioned as above is not shown, it may also be formed in the assistant mold body 407 so as to insert a pyrometer or a thermocouple therein. The hole positions of the assistant mold body 407 and the mold body 405 are matched with each other so as to allow the pyrometer or the thermocouple to be passed through both the assistant mold body 407 and the mold body 405.

FIGS. 6A and 6B show the microstructure and the X-ray results of $Al_3BC_3$ synthesized using the mold 200 according to the present invention. The synthesis process was performed in such a manner that 3.5 g of a powder material comprising Al, $B_4C$ and C to synthesize $Al_3BC_3$ was used and maintained at 1525° C. at a rate of 50° C./min for 15 min.

As is apparent from the microstructure image, almost all of the synthesized $Al_3BC_3$ powder had a small diameter of 1 μm or less. From the X-ray results, it can be seen that the secondary phase was slightly present but almost pure $Al_3BC_3$ powder was synthesized.

In contrast, when performing synthesis in an induction furnace typically used to synthesize powder, heating had to be performed at 1750° C. for 2 hr to obtain X-ray results similar to those of FIG. 6B. In this case, coarse powder having a size of ones of μm or more was obtained because of high reaction temperature and long maintenance time. FIG. 6C shows $Al_3BC_3$ powder obtained after synthesis at 1800° C. for 2 hr using the induction furnace. In this case, the average particle size was very coarse to the extent of 10 μm or more.

Thus, the mold 200 according to the present invention is effective at preventing the powder from becoming coarse during the synthesis process.

Figure 7:
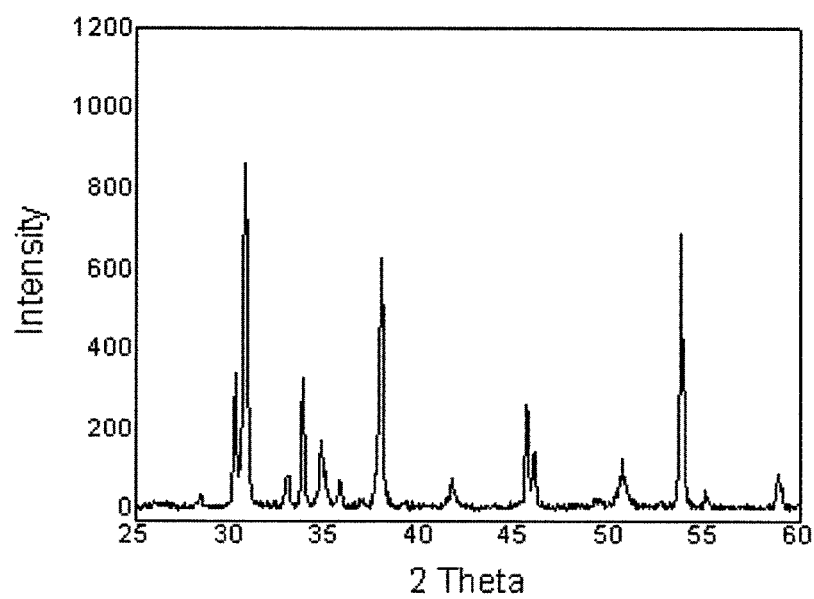
FIG. 7 is a graph showing the X-ray results of $Al_3BC_3$ powder synthesized using the conventional mold.

FIG. 7 shows X-ray results of $Al_3BC_3$ powder synthesized using the conventional mold. As such, synthesis was carried out at 1500° C. for 25 min using 0.8 g of a powder mixture. Because a small amount of powder was used and synthesis was carried out for a comparatively long period of time, $Al_3BC_3$ in single phase was mainly synthesized. During the test, however, the electrodes were very excessively heated, and heat treatment could not be performed for 25 min or longer.

Even after 4 g of a powder mixture was reacted at 1550° C. for 30 min using the novel mold 200, 400 according to the present invention, overheating of the pressing shaft and the electrodes 301, 303 could not be observed with the naked eye.

These results show that in the case of a thick mold body 101 as is true of the conventional mold 100, the sintering and growth of the synthesized powder are based on the pressure applied by the pressing shaft, and the equipment may malfunction because of the extended synthesis time.

The mold 400 of FIG. 4 may be formed to be thinner than the conventional mold 100 because tensile stress does not occur on the mold, thus enabling a small amount of electricity to be supplied to heat the mold. On the other hand, in the case where the molds have the same inner diameter, the mold covers 401, 403 of FIG. 4 have the smaller contact area with the upper and lower electrodes, compared to the mold covers 203, 205 of FIG. 2. Hence, when heat is generated on the mold covers due to synthesis at high temperature, the mold 400 of FIG. 4 may reduce the heating of the electrodes due to direct heat conduction to the electrodes from the mold, compared to the mold 200 of FIG. 2.

Therefore, the mold 200, 400 according to the present invention enables the powder to be synthesized within a short time at low temperature, compared to when using the heating method by means of the induction furnace to which a spark plasma sintering process was typically applied.

Furthermore, the mold 200, 400 according to the present invention is advantageous in terms of preventing pyrolysis of the synthesized powder at high temperature due to overheating of the mold.

As described hereinbefore, the present invention provides a mold for synthesizing ceramic powder using spark plasma sintering. According to the present invention, a synthesis process without performing pressing is adopted to synthesize ceramic powder, thus maximally suppressing the production of aggregates in synthesized powder.

Also in the present invention, mold covers having a greater cross-sectional area are introduced instead of eliminating a press unit, so that electricity is supplied thereto, thus preventing the problems of a conventional mold, namely, the heating of electrodes and a pressing shaft of the body of equipment caused by a rapidly increasing resistance generated from the press unit, whereby the equipment can be prevented from malfunctioning and can be efficiently subjected to the corresponding process.

Also according to the present invention, the cross-sectional area of a mold body is less than that of the conventional mold, and thus even when a small amount of electricity is supplied, the mold body can be easily heated whereas the overheating of electrodes can be suppressed, thereby reducing power consumption.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mold for synthesizing ceramic powder using spark plasma sintering, suitable for use as a mold system which is subjected to spark plasma sintering, comprising: a hollow cylindrical mold body into which a powder material used to synthesize ceramic powder is charged; and a pair of mold covers securely fastened to a top and a bottom of the hollow cylindrical mold body, respectively, wherein the pair of mold covers are configured such that a surface thereof in contact with the hollow cylindrical mold body is formed to be planar so that pressure is not directly applied to the powder material even when pressure is applied to the mold system during synthesis of the powder material, and each of the mold covers is in direct contact with its respective end of the hollow cylindrical mold body, wherein each of the mold covers has a recess into which at least a portion of the hollow cylindrical mold body is inserted, and an inner diameter of the recess is greater than an outer diameter of the hollow cylindrical mold body.

2. The mold of claim 1, wherein at least a portion of an outer surface of the hollow cylindrical mold body and at least a portion of an inner surface of the recess of each of the mold covers are threaded to form threaded connections between the hollow cylindrical mold body and the mold covers, so that the hollow cylindrical mold body and the mold covers are removably attached to each other.

3. A mold for synthesizing ceramic powder using spark plasma sintering, suitable for use as a mold system which is subjected to spark plasma sintering, comprising: a hollow cylindrical mold body into which a powder material used to synthesize ceramic powder is charged; a pair of mold covers securely fastened to a top and a bottom of the hollow cylindrical mold body, respectively; and a hollow cylindrical assistant mold body in which the hollow cylindrical mold body is housed and which is configured to allow the pair of mold covers to be passed therethrough, wherein at least a portion of an outer surface of the mold covers and at least a portion of an inner surface of the hollow cylindrical assistant mold body are threaded to form threaded connections between the mold covers and the hollow cylindrical assistant mold body, so that the mold covers and the hollow cylindrical assistant mold body are removably attached to each other.

4. The mold of claim 3, wherein the hollow cylindrical mold body and the hollow cylindrical assistant mold body are formed separately from each other, or are integrally formed with each other.

5. The mold of claim 3, wherein a shape of a transverse cross-section of an outer portion or an inner portion of the hollow cylindrical assistant mold body is any one selected from among a circular shape, an oval shape, and a polygonal shape.

6. The mold of claim 1 or 3, wherein a shape of a transverse cross-section of an outer portion or an inner portion of the hollow cylindrical mold body is any one selected from among a circular shape, an oval shape, and a polygonal shape.

7. The mold of claim 1 or 3, wherein the hollow cylindrical mold body or the hollow cylindrical assistant mold body has at least one hole into which a thermocouple or a pyrometer is inserted.

* * * * *